United States Patent [19]

Boudou et al.

[11] Patent Number: 6,018,795
[45] Date of Patent: Jan. 25, 2000

[54] PROCESS AND SYSTEM FOR OBTAINING AND DISTRIBUTING A TICKET IDENTIFYING A TASK OR EVENT IN A MULTI-NODE DATA PROCESSING SYSTEM

[75] Inventors: Alain Boudou, Vert; Christian Billard, Paris; Daniel Daurès, Malabry, all of France

[73] Assignee: Bull S.A., Louveciennes, France

[21] Appl. No.: 08/903,351

[22] Filed: Jul. 30, 1997

[30] Foreign Application Priority Data

Aug. 1, 1996 [FR] France .................................. 96 09750

[51] Int. Cl.[7] .................................................. G06F 13/00
[52] U.S. Cl. .............................. 712/32; 712/31; 709/208
[58] Field of Search ........................... 395/670, 200.59, 395/200.47, 280, 200.33, 800.28, 800.32; 712/31, 32; 709/208, 217, 229

[56] References Cited

U.S. PATENT DOCUMENTS

| | | | |
|---|---|---|---|
| 4,608,631 | 8/1986 | Stiffler et al. ........................ | 395/293 |
| 4,658,351 | 4/1987 | Teng .................................... | 395/673 |
| 5,005,122 | 4/1991 | Griffn et al. ....................... | 395/200.3 |
| 5,027,297 | 6/1991 | Garitty et al. ....................... | 702/187 |
| 5,265,249 | 11/1993 | Kumamoto ........................... | 395/704 |
| 5,283,896 | 2/1994 | Temmyo et al. ..................... | 395/674 |
| 5,327,557 | 7/1994 | Emmond ................................ | 707/3 |
| 5,418,937 | 5/1995 | Inoue ............................... | 395/184.01 |
| 5,684,993 | 11/1997 | Willman .............................. | 395/677 |
| 5,717,869 | 2/1998 | Moran et al. ....................... | 345/339 |
| 5,745,693 | 4/1998 | Knight et al. ................... | 395/200.54 |

FOREIGN PATENT DOCUMENTS

| | | |
|---|---|---|
| 0300516 | 5/1982 | European Pat. Off. . |
| 0394172 | 3/1990 | European Pat. Off. . |
| 0661634 | 11/1994 | European Pat. Off. . |

*Primary Examiner*—Zarni Maung
*Attorney, Agent, or Firm*—Kerkam, Stowell, Kondracki & Clarke, P.C.; Edward J. Kondracki

[57] ABSTRACT

For the obtainment of a unique number identifier called a ticket indentifying a task or an event in a multi-node data processing system (SYS), a master node (Ny) for distributing the ticket in the system is designated, and it includes a ticket generator (TICKy:VALy, SESSy, COUNTy) whose address (TICK_ID) is stored in a reference register (REF) of each node. When a node (Nx) requests a ticket, it reads the address (TICK_ID) in this register and thus accesses the ticket generator of the master node (Ny). A backup or substitute node (Ns) can replace the master node (Ny) in case of a failure (TICK-MISS).

22 Claims, 6 Drawing Sheets

PROCESS AND SYSTEM FOR OBTAINING AND DISTRIBUTING A TICKET IDENTIFYING A TASK OR EVENT IN A MULTI-NODE DATA PROCESSING SYSTEM

BACKGROUND OF THE INVENTION

1. Field of the Invention

The invention relates to a process for distributing unique number identifiers called tickets in a multi-node data processing system. A multi-node data processing system is composed of remote data processing systems called nodes, interconnected with one another by electrical or optical transmission links.

The invention is particularly adapted to multi-node data processing systems wherein the nodes each run their own operating system and/or each have several processors, thus constituting multiprocessor multi-mode systems, and/or the links are dedicated to communication between these nodes. The links can convey messages either in the form of serial bit streams (serial links) or in the form of successive bit slices disposed in parallel (parallel links).

Corollary objects of the invention are a multi-node data processing system which implements the process, as well as a data processing node and an integrated circuit for implementing the process or the data processing system.

2. Description of Related Art

For purposes of programming multi-task applications, it may be necessary to dynamically assign an identifier to a task or a time label or time stamp to an event.

It is understood that in order to distinguish a task from other tasks, the identifier of the task must be unique within the system. Likewise, in order to distinguish the position of an event in the time sequence of events, the time stamps must be ordered.

The identifiers and the time stamps can be obtained from a mechanism provided by the system. The function of this mechanism is to deliver, in response to a request for an identifier or a time stamp, a number which is unique in the space and which lasts for enough time to prevent any error. This number corresponds to a numeral and is called a ticket, and the mechanism provides a ticket distribution service. A ticket is usually distributed in a determined order, which is increased or decreased in a monotonic way according to the temporal order of the requests for tickets. The distribution of the tickets is ordinarily performed by a software component.

This software component manages the distribution of the tickets in a centralized way. This centralization requires communication between the operational software requesting a ticket and the software ticket distribution component. This involves internodal software and hardware communication mechanisms which carry out the execution of protocols and the physical transfer of data. In practice, passage through internodal communications management software complicates the operational software of the system and slows down the distribution of the tickets.

Moreover, there is currently increasing demand for a multi-node data processing system with high availability. This quality means that the system must retain its functionalities in spite of the occurrence of a hardware or software malfunction, or even a loss of part of the system, the loss of a node, for example. In this case, it is essential that the distribution of the tickets also retain its functionality. The software solution consists of distributing the distribution service among the nodes or of duplexing the service. These two solutions require additional internodal communications in order to ensure the consistency of the distribution of tickets throughout the system. This further complicates the operational software of the system. Moreover, by increasing the number of internodal communications, the software substantially slows the distribution of tickets.

SUMMARY OF THE INVENTION

The object of the invention is to distribute unique number identifiers called tickets in a way that alleviates the load on the operational software of a multi-node data processing system.

Another object is to improve the performance of the ticket distribution by substantially reducing the number and/or the duration of internodal communications. The distribution can then be carried out with low latency and a high throughput.

Another object is to retain the preceding advantage in a system with high availability.

Another object is to simplify the ticket distribution process and its implementation.

The subject of the invention is a process for distributing unique number identifiers called a ticket identifying a task or an event in a multi-node data processing system, including hardware located at a specific address for generating a ticket characterized in that it comprises determining from among the nodes of the system a master node for distributing the ticket, storing the address of the ticket generator in these nodes and, when one of these nodes requests a ticket, reading this address in the requesting node and accessing the ticket generator.

The result is a multi-node data processing system comprising a ticket distribution mechanism, a ticket identifying a task or an event in the system, characterized in that the mechanism is distributed in nodes of the system in respective ticket distribution cells comprising, in a master node, a hardware ticket-generating means, and in each of these nodes, a means for storing the address of the ticket generator and a means for controlling access to the storage means of the corresponding node and to the ticket generator of the master node.

Other subjects of the invention are a data processing node and an integrated circuit incorporating a ticket distribution cell for implementing the process or the system defined above.

BRIEF DESCRIPTION OF THE DRAWINGS

The characteristics and advantages of the invention will emerge from the following description, given by way of example and in reference to the appended drawings.

In the drawings.

DESCRIPTION OF THE PREFERRED EMBODIMENTS

1. Preliminary presentation and definitions

Figure 1:
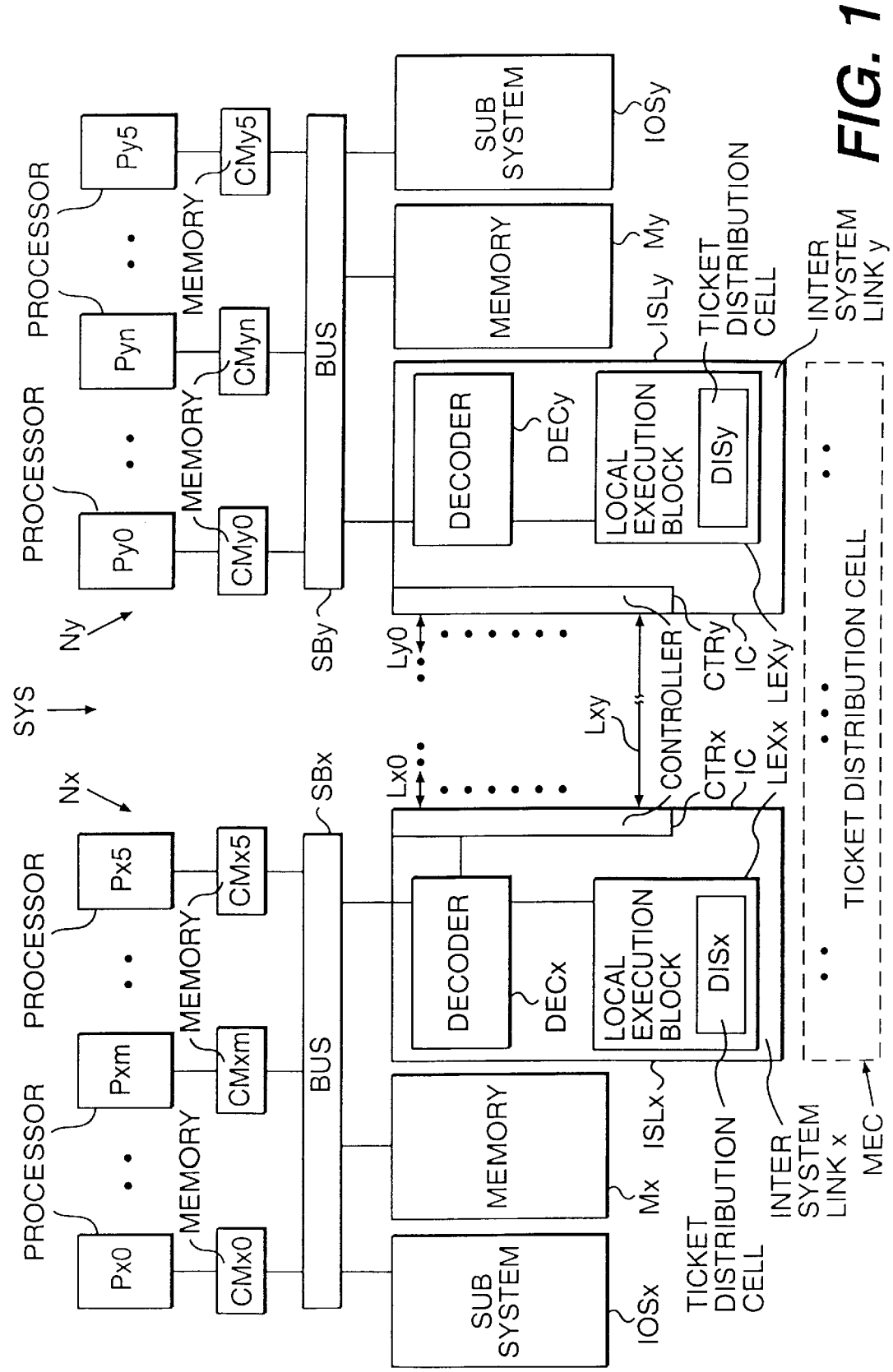
FIG. 1 is a block diagram illustrating the structure of a multi-node data processing system according to the invention.

The data processing system SYS represented in FIG. 1 comprises a plurality of processing nodes N (Nx, Ny, etc.) each having its own operating system and therefore functioning independently from the others. The nodes N are connected to one another by transmission links L. In the example illustrated, the links L are bidirectional serial data transmission links and they include in their references the indications of the numbers of the two nodes the respective links connect, such that for example Lxy indicates the link connecting the nodes Nx and Ny. The use of internodal serial data transmission links is less voluminous in terms of its connections than the standard parallel data transmission links. It therefore allows the utilization of a greater number of point-to-point connections with other nodes and the transmission of a larger number of simultaneous communications.

Each node comprises a plurality of processors P whose references indicate the number of the node and possibly the sequence number of the processor in the node. Thus, Pxm designates the processor of the node Nx with the order m. The system SYS embodied, which serves as an example, comprises eight nodes with six processors each. In the example illustrated, each processor P is considered to be connected to a cache memory CM, which can be integrated into the same integrated circuit as the processor. Each node also comprises a system bus SB connected to the cache memories CM, to a memory M, to an input-output subsystem IOS and to an inter-node communication module ISL (Inter System Link). Each of these components in the nodes Nx and Ny illustrated is assigned the subscript x or y of the corresponding node. The module ISLx, like all the other modules of the system, has an internal interface with the system bus SBx of the node Nx as well as an external interface with the links L connecting the node Nx to the other seven nodes of the system, including the link Lxy. Each module ISL illustrated is preferably included in an integrated circuit IC.

Figure 2:
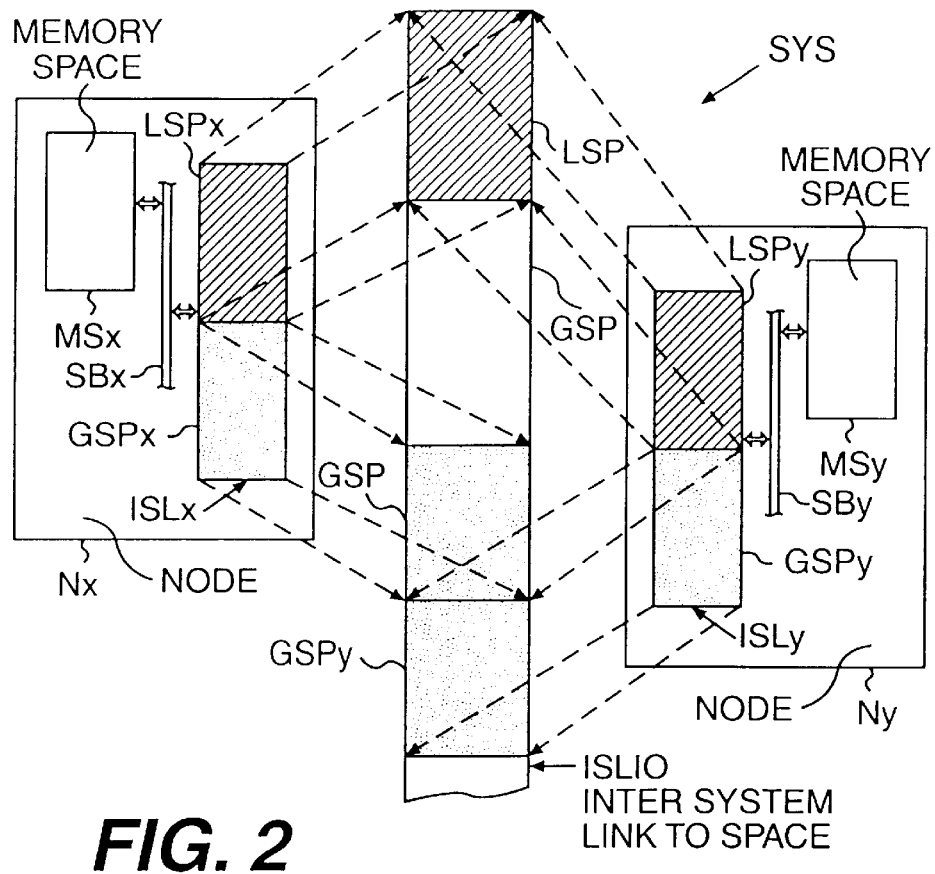
FIG. 2 is a schematic view of a structure of the address space of the system represented in FIG. 1.

FIG. 2 illustrates a characteristic of the system SYS given by way of example, which is not necessary but advantageous. According to this characteristic, two types of address spaces exist in the system SYS, namely a memory space MS and an input-output space ISLIO. A memory space is the space normally formed by the memories, while the input-output space ISLIO is the available address space for the registers contained in all of the modules ISL. These two spaces correspond to two respective access types, which are translated by the two states of a request bit T in the system bus SM. It is assumed that the request bit T=0 corresponds to an access in the memory space MS and that T=1 corresponds to an access in the space ISLIO. On the other hand, merely in order to facilitate the understanding of the description, the requests transmitted through the system busses, and which relate to the two respective spaces, have different names here: the Read/Write requests for the memory space and the programmed input-output requests PIO Load and PIO Store for the space ISLIO.

It has been seen that the address space ISLIO in a module ISL corresponds to an address space to which access is achieved by a reference having a request bit T=1. The addressability of this space is for example 4 gigabytes. The space ISLIO is physically distributed among all of the nodes. FIG. 2 illustrates this distribution among the nodes Nx and Ny indicated in FIG. 1. Each node in this figure is schematically represented by its respective system bus SBx, SBy, by its respective memory space MSx, MSy, and by its portion of the space ISLIO physically present in the respective modules ISLx, ISLy. The space ISLIO illustrated partially and schematically in FIG. 2 relates to the address spaces in the modules ISL and is divided into a local space LSP and a global space GSP. The local space LSP, which is hatched in FIG. 2, contains the registers accessible only by the node to which the module ISL belongs. The same register of a module ISL is accessed at the same address by the processors P of the node to which the register belongs, no matter what the node. Thus, a request to an address of the local space LSP is never transmitted through the links L. In brief, the space LSP is a private space with respect to the node. This is indicated schematically in FIG. 2 by the fact that the transfers from the local spaces LSPx and LSPy in the space ISLIO, represented by broken lines, occur in the same local space LSP of the space ISLIO. The global space GSP, which is spotted in FIG. 2, contains registers addressable by all the nodes of the system SYS. The global space GSP is divided into a number of parts that are physically implanted in the modules ISL of the respective nodes. For example, as indicated by the broken lines in FIG. 2, the global spaces GSPx and GSPy of the space ISLIO are physically implanted in the respective modules ISLx and ISLy. The global space GSP is therefore a shared and physically distributed address space. For example, a bit field of the address can supply an identification of the node to which the register related to this address belongs.

In the example illustrated, the modules ISL comprise hardware resources, for example registers, whose addresses belong to the space ISLIO. Within the scope of the example considered, a requesting processor executes a set of instructions, among which LOAD designates a read instruction corresponding to an input in the processor which executes the instruction, while STORE designates a write instruction corresponding to an output outside the processor. When the instructions LOAD and STORE are directed to a register of a module ISL, PIO Load or PIO Store requests incorporating the address of the register in question are sent through the system bus SB corresponding to the emitting processor. The module ISL having this register receives the PIO Load and PIO Store requests and interprets them. A PIO Load request is a request to read the content of a register of the module ISL in order to transmit it to the requesting processor. A PIO Store request is a request to write, in the register of the module ISL, data existing precisely in the requesting processor and transiting through the system bus SB.

The execution by a processor of the instructions LOAD and STORE ends when the processor receives from the system bus a response to the PIO Load or PIO Store request it has emitted. The response to a PIO Load request consists of data, while the response to a PIO Store request consists of an acknowledgement. On the other hand, each module ISL can be commanded to change the state of a component internal to the module or to trigger specific actions of this component. In this case, the commands are in the form of PIO Load or PIO Store operations at specific addresses. Thus, for a PIO Store operation, for example, the address specifies the action to be taken while the data can parameterize the command.

Figure 3:
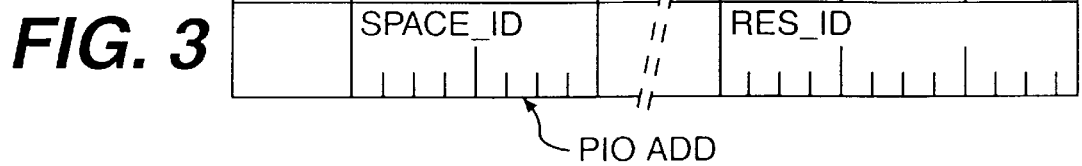
FIG. 3 is a schematic view of the structure of a programmed input-output address of a register used in the system represented in FIG. 1.

FIG. 3 illustrates an exemplary PIO address, designated PIO Add. The address PIO Add illustrated has thirty-two bits and includes two essential parts: a space identification field SPACE_ID, and a resource identification field RES_ID. The field SPACE_ID is made of high-order bits, in this case the eight bits 4:11, and represents a coded identification in the space ISLIO, the value 0 designating for example the local space LSP of the space ISLIO and the values 1–8 identifying the global spaces GSP related to the respective nodes N1–N8. The resource identification field RES_ID is made of the low-order bits 20:31 and provides a coded identification of the resources toward which the operation is directed, a register for example.

The principle for decoding a PIO address is the following. If the space identification field SPACE_ID has the value 0, the register is in the local space LSP of the space ISLIO and the request is transmitted to a local block for executing programmed input-outputs LEXx, which is a hardware element disposed in the module ISLx of the node Nx in question and is indicated in FIG. 1. If the space identification SPACE_ID corresponds to an identifier of the node Nx designated NODE_ID, the request is also transmitted to the local execution block LEXx. Otherwise, the request is to be executed in a remote node Ny by the block LEXy of this node. It is then transmitted through the link Lxy, and the response returns through the link Lxy to the node Nx to be transmitted through the system bus SBx to the requesting processor.

FIG. 1 also illustrates, in block diagram form, an exemplary internal structure of a module ISL of the system SYS. The module ISLx, for example, is included in an integrated circuit IC and comprises a decoder DECx connected to the system bus SBx, an internodal link controller CTRx connected to the links L and to the decoder DECx. The decoder DECx receives signals from the system bus SBx and from the controller CTRx and decodes them, particularly in order to know which node they are intended for and to direct them to their destination. For example, a request issued by a processor Pxm and received from the system bus SBx by the decoder DECx will be directed either to the block LEXx if the address of the node corresponds to that of the node Nx, or to the controller CTRx if the address designates a remote node Ny. Conversely, a response transmitted through the link Lxy and received by the controller CTRx will be directed by the decoder DECx to the system bus SBx or to the block LEXx to be processed therein.

2. Detailed description of an exemplary embodiment of the invention.

FIG. 1 also illustrates in partial, schematic form an exemplary ticket distribution mechanism MEC according to the invention, used in the system SYS. The mechanism MEC is distributed in nodes of the system in respective ticket distribution cells DIS. In order to simplify the disclosure which follows, each node of the system is assumed to contain one cell DIS. Consequently, the mechanism MEC illustrated is formed of the eight cells DIS (DISx, DISy, etc.) included in the eight respective nodes N of the system SYS.

Figure 4:
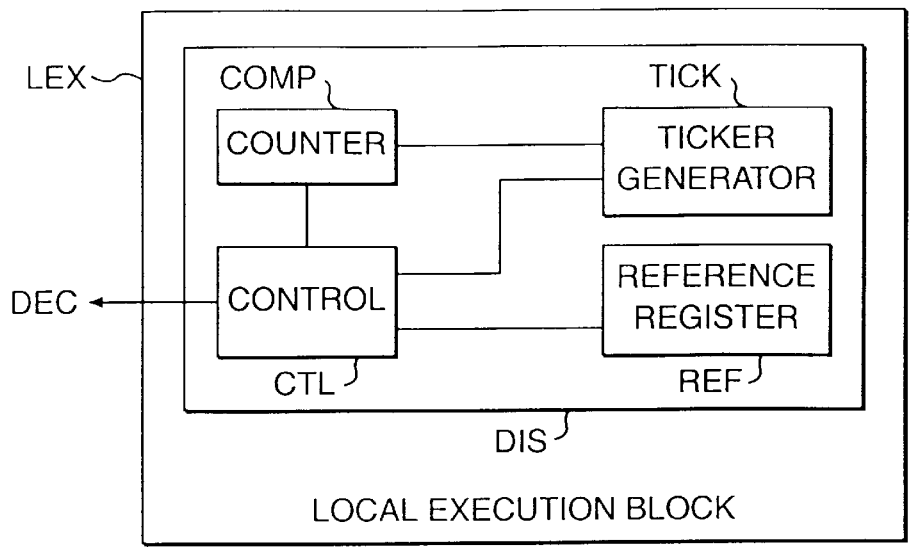
FIG. 4 is a schematic view of an exemplary structure of a cell of the ticket distribution mechanism according to the invention used in the system represented in FIG. 1, the cell illustrated being contained in the local module for executing the programmed inputs of an internodal communication module included in each node of the system.

FIG. 4 schematically illustrates an exemplary preferred structure of a ticket distribution cell DIS according to the invention. According to this example, the cell DIS is identical in each node N and is included in the local execution block LEX of the communication module ISL of the corresponding node. It comprises a reference register REF, a ticket generator TICK, a counter COMP and a control device CTL. The control device CTL is connected to the counter COMP, to the register REF and to the ticket generator TICK. The ticket generator TICK is also connected to the counter COMP and in the example illustrated it is formed of a register called a ticket register. The control device CTL is also connected, outside the block LEX to the decoder DEC of the node. Thus, thee registers REF and TICK are read- and write-accessible by means of the control device CTL. In a particular node (Nx for example), the designation of the cell and its elements will include the number of this node (DISx, CTLx, etc.).

Figure 5:
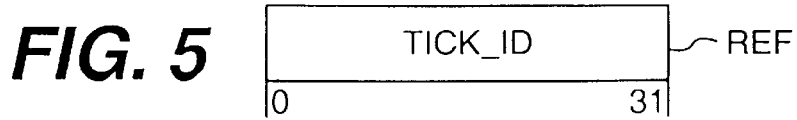
FIG. 5 is a schematic view of the structure of a reference register of the ticket distribution device represented in FIG. 4.

FIG. 5 illustrates an exemplary format of the reference register REF. It is a four-octet register containing a ticket address field TICK_ID. The field TICK_ID represents the global physical address of the ticket register TICK and supplies the path for access to this register. The reference register REF is managed by two addresses of the space ISLIO, called REF-LOCAL-ADD and REF-GLOBAL-ADD. The local address REF-LOCAL-ADD of the local space LSP is used in a read operation PIO Load for obtaining access to a ticket register TICK. The global address REF-GLOBAL-ADD of the global space GSP is used in a PIO Load operation to request a procedure for the migration of the ticket distributor and in a PIO Store operation to change the path for access to a ticket register TICK, as will be described below.

Figure 6:
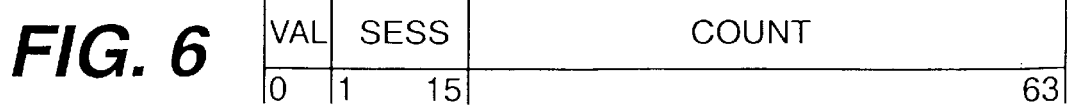
FIG. 6 is a schematic view of the structure of a ticket register of the ticket distribution device represented in FIG. 4.

FIG. 6 illustrates an exemplary format of the ticket register TICK. It is a bank of eight-octet registers containing three fields: a validity field VAL formed of one bit (0 order bit) and representing the validity of the ticket; a session field SESS formed of the remaining bits of the first two octets (bits 1:15) and representing a session number; and a count field COUNT formed of the next six octets (bits 16–63) and representing the value of the counter COMP. The ticket register TICK is accessible in the global space GSP. In operation, a read operation PIO Load carried out at the address represented by the field TICK_ID of the reference register REF supplies the content of the ticket register TICK and increments the counter COMP as well as the associated field COUNT of the ticket register TICK. A write operation PIO Store at the same address records the data in the fields SESS and VAL and resets the counter COMP to zero. The session field SESS and the count field COUNT form the number of the ticket. The count field COUNT relates to the session indicated in the field SESS. The field SESS identifies each time interval in order of the accesses to the only valid ticket register in the system SYS. The field SESS therefore represents a continuous time period of ticket distribution by the ticket generator in the master node. If the master node is a predetermined node, the field SESS changes progressively following failures and successive initializations of the node or of the ticket distribution mechanism. If the master node can change, the field SESS changes progressively with each change of the master node and/or with each initialization of the master node. The count field COUNT of the register TICK delivering a valid ticket identifies the accesses during the time interval identified by the field SESS. It therefore represents, during a session identified by the field SESS, the number of accesses to the ticket generator of the master node at the moment of the access to this generator for obtaining a ticket. It has been seen that it is reset to zero during a PIO Store operation executed at the address indicated by the field TICK-ID. It is assumed that the order of the accesses changes in increasing fashion, by incrementation of the fields SESS and COUNT, and that the validation is represented by the bit VAL=1. It could also, of course, change in decreasing fashion.

The control device CTL executes read or write accesses to the registers of a cell DIS to which it belongs or to those of the cells DIS of the other nodes. By means of a read access, the control device CTL obtains the contents of the registers of the cell DIS, whereas a write access records data in them. The control device CTL knows the number of the node to which it belongs and the addresses of the registers REF and TICK. A read access of the register REF at the address REF-LOCAL-ADD by the processor or processors of the node is a ticket request and triggers an action of the control device CTL. This action consists of acquiring the ticket in order to give it in response to the read access. The uniqueness of the ticket resides in the fact that at any moment there is only one valid ticket register TICK. The node which contains the only valid ticket register is called the master node and the valid ticket distribution cell DIS is called the ticket distributor. Consequently, only the master register TICK has its field VAL=1.

Figure 7:
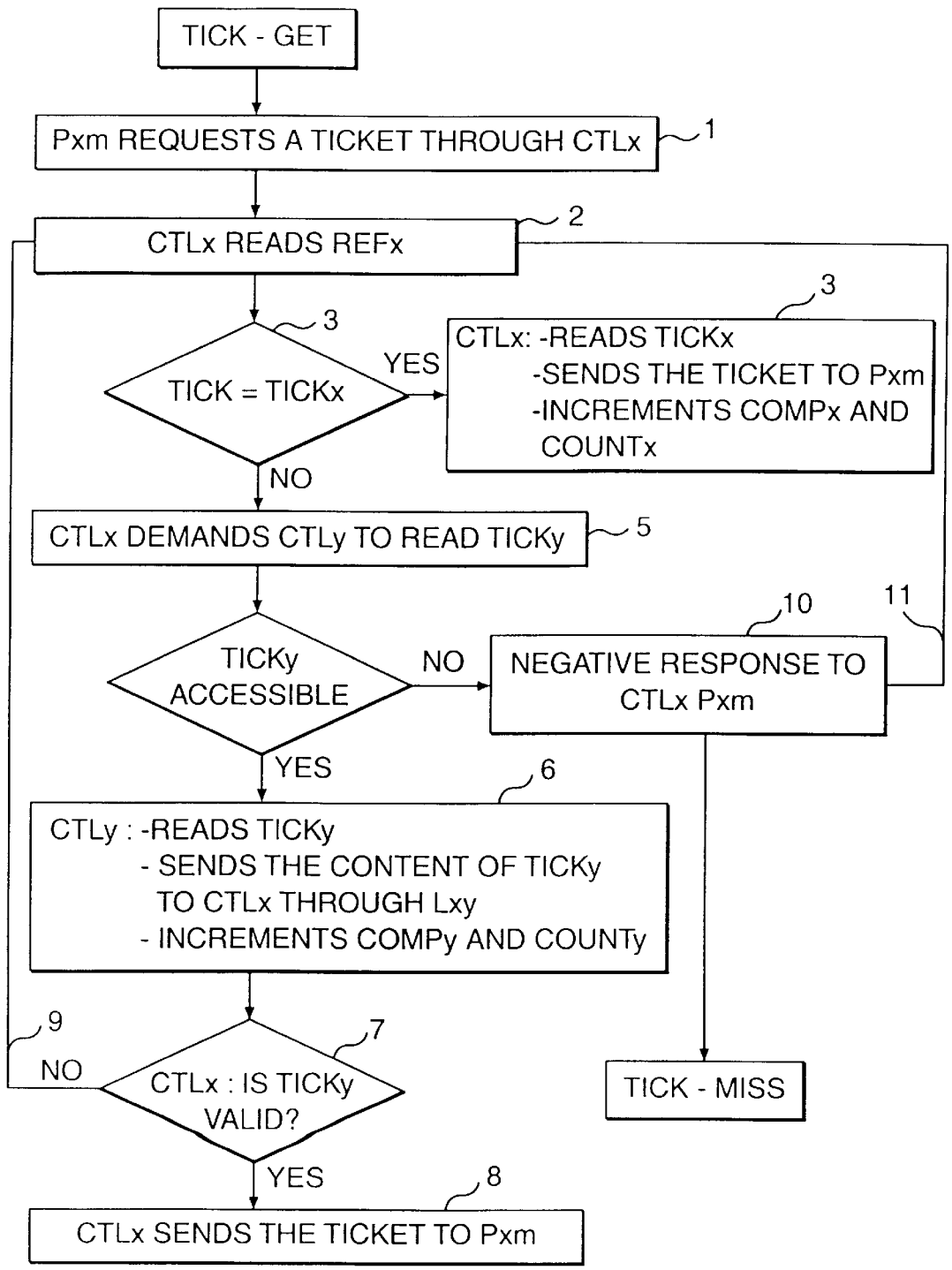
FIG. 7 is a flow chart illustrating the steps of an exemplary ticket obtainment procedure for implementing the ticket distribution process in the system represented in FIG. 1.
Figure 8:
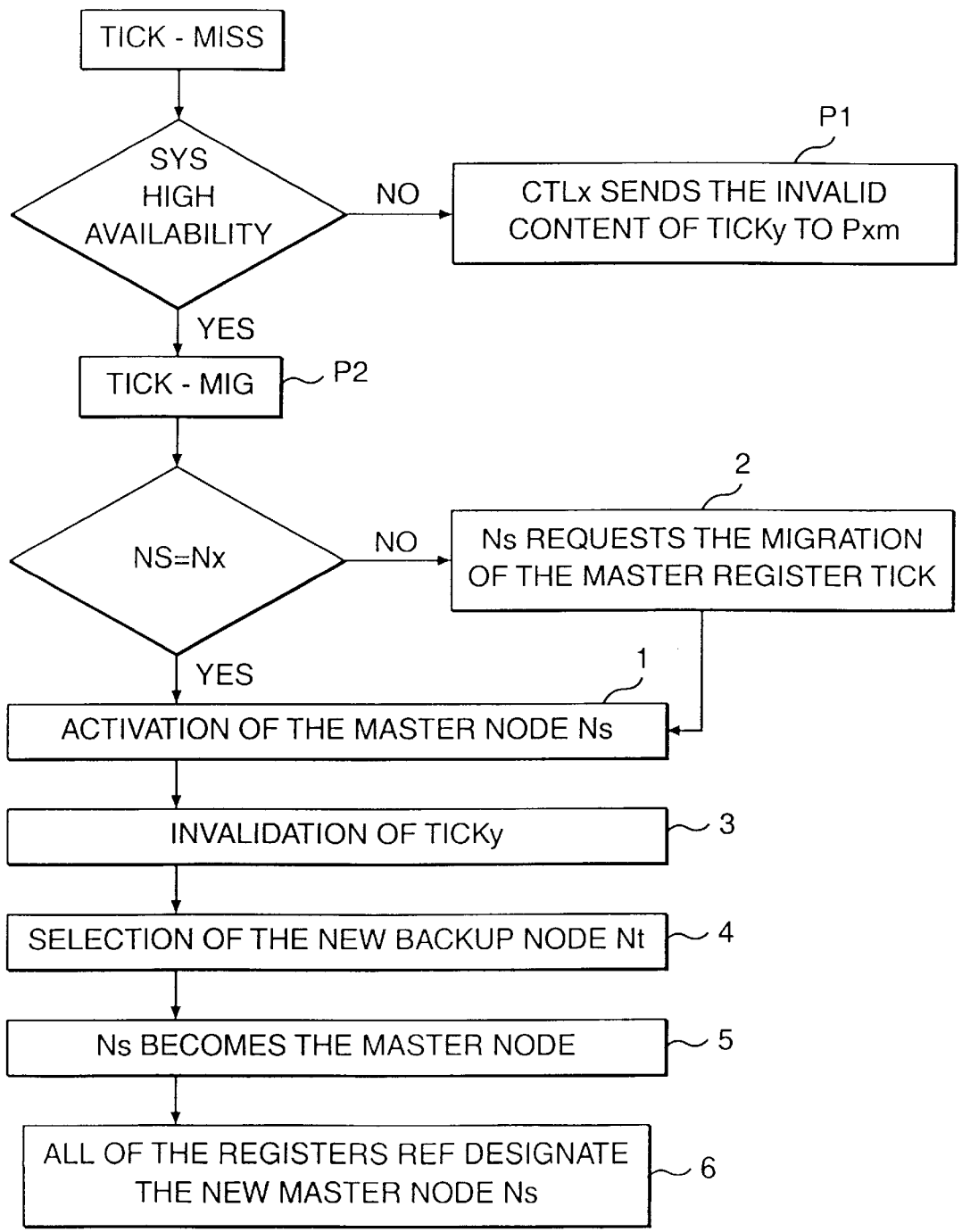
FIG. 8 is a flow chart illustrating the steps of an exemplary fault handling procedure indicated in FIG. 7 for implementing the ticket distribution process in the system represented in FIG. 1.
Figure 9:
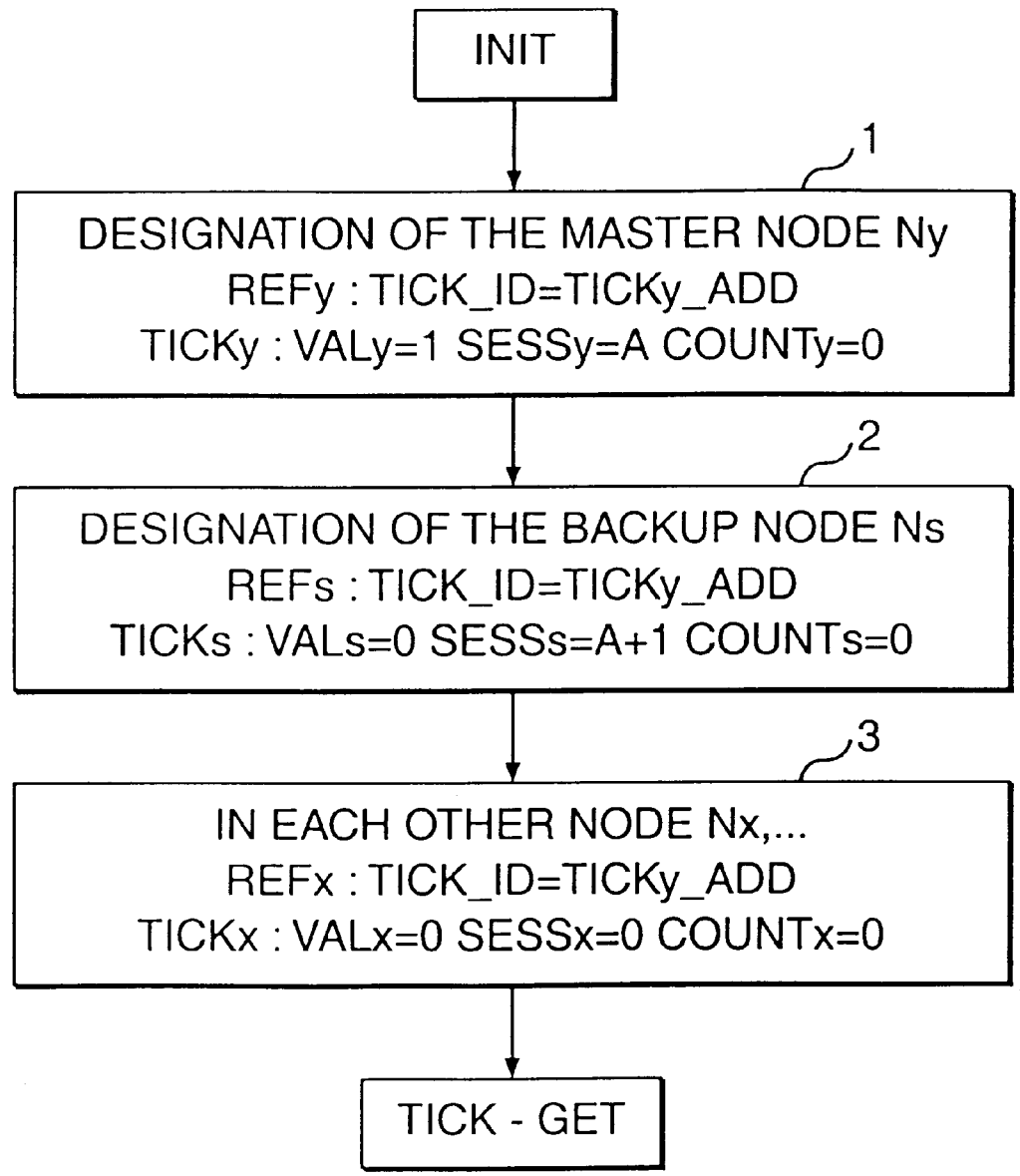
FIG. 9 is a flow chart illustrating the steps of an exemplary initialization procedure for implementing the ticket distribution process in the system represented in FIG. 1.

The ticket distribution process according to the invention comprises, according to the example in question, a ticket obtainment process TICK-GET, a fault handling procedure TICK-MISS and an initialization procedure INIT, respectively illustrated by the flow charts of FIGS. 7, 8 and 9.

Figure 10:
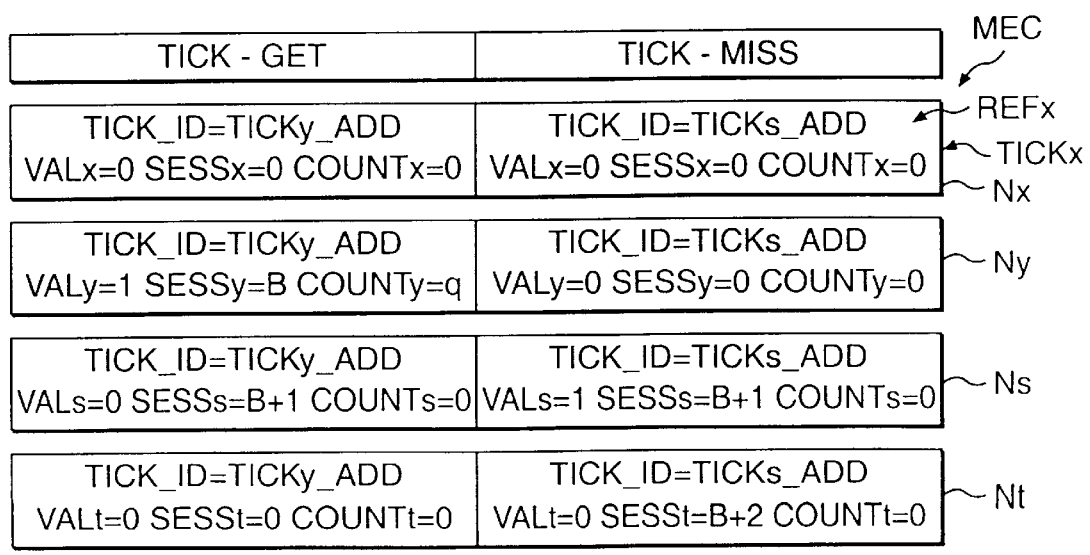
FIG. 10 illustrates the states of the two registers included in the cells, represented in FIG. 4, of the four nodes which, in the system represented in FIG. 1, are involved in the procedures described in reference to the algorithms represented in FIGS. 7 and 8.

FIG. 10 is a view in partial, schematic form of the ticket distribution mechanism MEC distributed in the four nodes of the system SYS which are involved in the process described in reference to FIGS. 7 and 8. FIG. 10 illustrates the registers REF and TICK of the corresponding cells and the states of these registers during the ticket obtainment procedure TICK-GET and the fault handling procedure TICK-MISS. The left part relates to the procedure TICK-GET and assumes that the master node is the node Ny and that the node requesting a ticket is the node Nx. The right part relates to the procedure TICK-MISS.

FIG. 7 illustrates the steps of the ticket obtainment procedure TICK-GET, while the state of the registers REF and TICK during this procedure are indicated in the left part of the nodes represented in FIG. 10.

In step 1, it is assumed that in the system SYS the software running in the node Nx intends to obtain a ticket. A processor Pxm of the node Nx running this software therefore processes an instruction to read the register REFx at the address REF-LOCAL-ADD of the local space LSP of the space ISLIO. The result is a request REQx (a PIO Load request) to read the register REFx of the cell DISx of the node Nx. The decoder DECx receives the request REQx, decodes it, and transmits it to the control device CTLx.

In step 2, the control device CTLx reads the register REFx and analyzes the field TICK_ID of the register REFx, which supplies the address of the ticket register TICK of the ticket distributer DIS in the system SYS. This register is called the master ticket register.

In step 3, the control device CTLx verifies whether the master ticket register is the register TICKx of the node Nx.

Step 4 takes place if the node Nx is the master node. In this case, the content TICK_ID of the register REFx corresponds to the address of the register TICKx (TICK_ID= TICKx_ADD). This step is not illustrated in FIG. 10. The control device CTLx reads the ticket register TICKx and transmits its content to the processor Pxm. Assuming that the current session of accesses to the valid ticket register TICKx has the value B and that the number of accesses to this register in this session is p, the processor Pxm receives the following content of the register TICKx, which represents the content of the ticket received:

TICKx: VALx=1, SESSx=B, COUNTx=p.

Next, in this same step, the control device CTLx increments the counter COMPx by one unit. The new count field COUNT of the register TICKx is therefore also incremented by one unit (COUNTx=p+1). The number of the next ticket is therefore B, p+1.

Step 5 takes place if the address TICK_ID given by the reference register REFx indicates that the master ticket register is in a remote node, the node Ny for example, which in this case is the master node (TICK_ID =TICKy_ADD). The control device CTLx sends a command to read the ticket register TICKy of the node Ny. This command transits through an access path which includes the decoder DECx, the controller CTRx, the link Lxy, the controller CTRy, the decoder DECy and the control device CTLy of the ticket distributer DISy.

The question then arises as to whether or not the master register TICKy is accessible by CTLx. The register TICKy may not be accessible because of a failure of the node Ny or in the path for access to the master register TICKy, for example due to a failure of the link Lxy.

Step 6 occurs if the master register TICKy is accessible. In this case the control device CTLy reads the content of this register and sends it to the requesting node Nx as a response to its request. The number of the ticket read in the register TICKy and sent to the node Nxy is therefore SESSy=B and COUNTy=q. The controller CTRx of the module ISLx of the node Nx receives the response and sends it to the control device CTLx. After the reading of the register TICKy, the control device CTLy increments the counter COMPy and consequently, the count field COUNTy of the register TICKy (COUNTy=COUNTy+1).

In step 7, the control device CTLx verifies whether the content of the register TICKy is valid. Validity is indicated by the value of the field VAL (VAL=1), and it means that the register TICKy is the master ticket register in the system SYS. If the content of the register TICKy is valid, it constitutes the ticket requested.

Step 8 takes place if the content of the register TICKy is valid. The control device CTLx in this case transmits the ticket to the requesting processor Pxm as a response to the request REQx to read the reference register REFx.

Step 9 occurs if the ticket register TICKy is accessible but its content is not valid. This means that the node Ny, at the time of the reading of the register TICKy, is no longer the master node and that between the time when the reference register REFx was read in step 2 and the time when the master register TICKy designated by the register REFx was read, the mechanism MEC designated another master register and rendered it effective while invalidating the master register TICKy. The operation which corresponds to the change of master registers is called a master ticket register migration or a ticket distributer migration and will be described below. Step 9 consists of returning to step 2. If the migration has finished, the node Nx receives the ticket from the new master node. If not, the repetition of this cycle allows the node Nx to receive the ticket requested.

Step 10 takes place if the master register TICKy is not accessible. The control device CTLx of the requesting node Nx receives a negative response to its request. This step therefore represents a failure of the ticket request made by the processor Pxm as a result of a malfunction. This response triggers the fault handling procedure TICK-MISS of the ticket distribution process.

Step 11 assumes that the fault handling procedure TICK-MISS, as illustrated in FIG. 8, comprises the master register migration procedure P2. Step 11 of the procedure TICK-GET therefore consists of repeating the ticket request by returning to step 2, in a manner similar to step 9.

FIG. 8 illustrates an exemplary fault handling procedure TICK-MISS. This procedure is triggered in step 10 of the ticket obtainment procedure TICK-GET.

The procedure TICK-MISS is conditioned by the nature of the system SYS. The fault handling is different depending on whether or not the system has high availability supported by the hardware.

The fault handling procedure P1 takes place if the system does not have high availability. The control device CTLx of the requesting node Nx can for example, in response to the request REQx from the processor Pxm, return the invalid content of the ticket register TICKx (VALx=0). In this case the task in progress of the processor Pxm cannot continue. It is terminated or aborted and a message indicates that a failure has occurred due to a malfunction of the node Ny or in the path between the control device CTLx and the ticket register TICKy. The processor Pxm cannot re-execute the task unless the master node Ny is again active or the register TICKy again becomes accessible, or unless another master register has been activated and the ticket distribution mechanism has been re-initialized.

The procedure P2 takes place if the system has high availability supported by the hardware. The procedure P2 is called an automatic migration procedure TICK-MIG of the inaccessible master ticket register TICKy to a substitute or backup node Ns. The description of the procedure P2 requires a preliminary presentation of the initialization procedure INIT.

In order for the ticket obtainment procedure TICK-GET to run normally, it is necessary for all of the registers REF and TICK of the ticket distribution mechanism MEC distributed in all the nodes of the system SYS to be initialized correctly during the startup of the mechanism MEC. For this purpose, a software initialization routine is executed in the node chosen to be the first master node, in this case Ny.

FIG. 9 illustrates an exemplary algorithm representing the initialization procedure INIT. It involves the following steps, all of which correspond to write operations.

In step 1, the master node Ny is designated and its registers REFy and TICKy are initialized. In the register TICKy, the field VAL is validated (VALy=1), the session field SESSy has a predetermined initial value A, which can initially be the number 1 for example, and the counter COMP is set at zero, hence COUNTy=0. In the register REFy, the address of the register TICKy (TICK_ID= TICKy_ADD) is written in the field TICK-ID.

It must be noted that if the procedure TICK-GET described above had taken place just after initialization, the ticket would have had the number of TICKy at initialization. However, the number described and indicated in FIG. 10 assumes the existence of another session B and another count COUNT with the value q.

In step 2 of the initialization procedure, a backup node Ns is designated. It can be determined by a simple rule, chosen during the design of the system. In the example illustrated, the system SYS designates as a backup node Ns the node having the following sequence number (Ns=Ny+1). The registers of the backup node are then initialized. In the backup ticket register TICKs the field VAL is invalidated (VALs=0), the field SESSs has the initial value A of the master register, incremented by one unit (SESSs=A+1) and the counter COMP is set at zero (COUNTs=0). In the backup reference register REFs, the address of the register TICKy is written in the field TICK_ID.

It must be noted in particular that in the example illustrated, the backup ticket register TICKs is designated by writing in its session field the number of the next session in which it will be the master and by resetting its field COUNT to zero. In the state of the procedure TICK-GET described in reference to FIGS. 7 and 10, which is subsequent to the initialization, the session was considered to have the number B. The backup register TICKs therefore has the following content, when the master register Ny is valid:

TICKs: VALs=0, SESSs=B+1 and COUNTs=0.

This is the content which appears in FIG. 10.

In step 3 of the initialization procedure the registers of all the other nodes are updated, the node Nx being chosen as an example. In the register TICKx, the field VAL is invalidated (VALx=0), the field SESS has a null value (SESSx=0), and the counter COMP is reset to zero (hence COUNTx=0). In the register REFx, the field TICK_ID has the address of the register TICKy. In this step, all the components of the ticket distribution service are initialized and the ticket obtainment procedure TICK_GET can start and be executed repeatedly.

FIG. 8 illustrates the steps of an exemplary P2 migration procedure TICK-MIG. FIG. 10 indicates the change of the states of the registers REF and TICK due to the migration of the master ticket register.

The procedure TICK-MIG is comprised of activating the backup node Ns and deactivating the master node Ny. In the example illustrated, it is the backup node Nx which initiates the migration of the ticket distributor. The procedure TICK-MIG can be executed in the backup node, either by its control device CTLs, or by a software routine triggered by an interrupt issuing from this control device. Once the migration has finished, the backup node Ns has become the new master node and a new backup node Nt is ready to ensure the continuity of the ticket distribution in case of a failure at an access to the new master register TICKS.

Step 1 of the procedure TICK-MIG is comprised of the activation of the backup node Ns. It takes place directly if the node which experienced the failure is the backup node. In this case, Ns=Nx. The node Nx knows that it is the backup node, either because the field TICK_ID of its reference register REFx indicates that the master node Ny has the value Nx−1, or because the session field SESSx is not null. This case is not illustrated in FIG. 10.

Step 2 takes place if the backup node Ns is not the requesting node Nx. The control device CTLx of the cell DISx requests the migration of the ticket distributor to the backup node Ns by performing a read access at the address REF-GLOBAL-ADD of the register REFs of the backup node. This step results in step 1 for activating the ticket distributor DISs.

Step 3 is comprised of requesting the lockout of the master node Ny so that it can no longer distribute valid tickets. This operation has no effect if the node Ny itself is malfunctioning. On the other hand, if for example the failure is due to the malfunction of the link Lxy, the master ticket register TICKy is inaccessible for the requesting node Nx, although it remains capable of delivering valid tickets to the other nodes of the system. Thus, step 4 is a safety for ensuring the uniqueness of the tickets delivered. The new content of the register TICKy is therefore TICKy: VALy=0, SESSy=0 and COUNTy=0.

Step 4 consists of choosing a new backup node Nt. In this case, the number of the following session is written in the field SESSt of the register TICKt: SESSt=SESSs+1=B+2.

In step 5, the backup node Ns becomes the new master node, so the field VALs of its register TICKs is validated (VALs=1).

In step 6, all the nodes of the system SYS receive the access path of the new valid ticket generator TICKs. This is done by writing, in the field TICK_ID of the registers REF of all the nodes, the address of the new master ticket register TICKs (TICK_ID=TICKs_ADD). This step completes the migration procedure TICK-MIG. The repetition of the request for a ticket by the control device CTLx according to step 11 of the procedure TICK-GET represented in FIG. 7 results in a reading of the new address TICKs_ADD of the master ticket register TICKs and the obtainment of a valid ticket from it.

It is clear from this description that the preferred example of the process according to the invention requires a relatively complex operation of the control devices CTL in the ticket distribution cells. Generally, several solutions are possible in order to simplify the operation of the cells DIS. However, an increase in the simplicity of the implementation of the process according to the invention translates into a proportional decrease in the performance of the ticket distribution process according to the invention.

According to a first example, the migration procedure TICK-MIG is not executed by the control device CTL as illustrated, but is executed entirely by a software routine. In this case, the function of the control device CTL can be fulfilled by a processor P of the node, or by a microprocessor or a microcontroller incorporated into the module which accesses the registers REF and TICK, such as the module ISL in the example illustrated. Variants can exist depending on the division between what is executed in hardware form by the control device CTL and what is executed in software form.

According to a second example, greater simplification can be obtained by having all or part of the procedure TICK-GET be handled by a processor of each node involved, or by a microprocessor or a microcontroller incorporated into the module which accesses the registers REF and TICK, such as the module ISL in the example illustrated.

Other variants can be brought to bear on the example illustrated by one skilled in the art. For example, in order to facilitate the present disclosure, it has been assumed that the ticket distribution mechanism MEC is distributed in all of the nodes of the system SYS. However, all the nodes of a system may not need tickets, in which case the ticket distribution mechanism involves only some of the nodes, at least two. On the other hand, each node can have any number of processors, and the internodal links L can be serial or parallel links. Moreover, an internodal link module ISL can be considered to be an element of the input-output subsystem IOS of the node and can be incorporated into it.

The preceding description of the ticket distribution mechanism MEC also makes it clear that each node involved must have the address TICK_ID of the master ticket register. However, this address could be stored in a means other than the reference register REF illustrated. This means could be, for example, the memory M of the node, in which the address TICK_ID would be stored in a location of this memory. In this case, access to this location can be achieved rapidly by any processor P of the node. The use of the register REF is preferable when it can be connected to a control device CTL illustrated or, as seen above, to a microprocessor or a microcontroller, which prevents the processor from having to execute the entire procedure TICK-GET and/or the procedure TICK-MIG.

On the other hand, it is not necessary for each node to incorporate a ticket register TICK. The master node could have the only ticket generator TICK in the system. It is also possible, as in the fault handling procedure TICK-MIG illustrated, to provide at least one node which includes a ticket register TICK to play the backup role. In a system having a small number of nodes, it is preferable for each node to have a ticket register TICK. But in a system in which a large number of nodes is involved, only the nodes that are commonly operational could retain a ticket register TICK. On the other hand, the preceding description of a ticket register TICK as a hardware ticket generating means is only one example among other possible examples. In a simplified form, the ticket generator TICK could simply be a counter, such as the counter COMP. The advantage of the register TICK is to be able to include fields other than the field COUNT. The validation field VAL is not necessary if only one node has a ticket generator. The same is true for the session field SESS, for example in the case where only one node has a ticket generator and the number of accesses to this register is always accounted for, independently from the failures of the node, so as to preserve the uniqueness of the tickets over a long period of time, thus ensuring a complete absence of conflicts between two tickets.

Generally, the subject of the invention is a process for distributing a ticket identifying a task or an event in a multi-node data processing system SYS, which process is comprised of determining from among the nodes of the system a master node Ny for distributing the ticket, of including within it a hardware ticket generating means TICK, of storing the address TICK_ID of the ticket generator in these nodes and, when one of these nodes requests a ticket, of reading this address in the requesting node and accessing the ticket generator.

According to a first improvement illustrated, each ticket is identified by a first field SESS which represents a continuous time period of ticket distribution by the ticket generator in the master node and by a second field COUNT which represents, during this period, the number of accesses to the ticket generator which have already taken place at the moment of the access which corresponds to this ticket request. It has been seen that the progression from one session to another can correspond to a change of location of the ticket generator, or to a failure of the master node. It also makes it possible to re-initialize the count field COUNT while preserving the uniqueness of the ticket.

Although only one node could have a hardware ticket generating means, a second improvement illustrated is comprised of including a hardware ticket generating means in at least two nodes of the system and of validating only the ticket generator of the master node. This offers the advantage of being able to replace the master node. One of the possible causes of replacement is a malfunction of the master node or in the path for access to the master ticket generator. In the example illustrated, the ticket distribution mechanism determines a backup node Ns for replacing the master node. The designation of the backup node can be performed in a way other than that illustrated. The replacement can also occur in various forms, specifically depending on whether or not the system has high reliability supported by the hardware. In other words, a system can, to varying degrees, be fault tolerant. If it is, the option described by way of example provides a substantial improvement in performance while implementing an automatic replacement procedure called a migration procedure TICK-MIG.

The migration procedure consistently updates the ticket generators TICK and the reference registers REF in all the nodes involved, so as to ensure the uniqueness of the ticket and the continuity of the distribution. This updating is preferably achieved by means of successive write operations, as illustrated, in order to avoid any conflict in the mechanism MEC that could be damaging to its consistency. Using this procedure, the backup node becomes the new host node of the valid ticket generator. Thus, the address TICK_ID of the ticket generator is consequently modified in all the reference registers REF. Furthermore, the ticket generator of the previous master node is invalidated. The example illustrated includes other optional but advantageous characteristics. First of all, the backup node is responsible for the replacement, that is, in this case, the execution of the migration procedure. Then, if the node requesting a ticket cannot access the ticket generator of the master node and it is the backup node, it executes the migration. If the node requesting a ticket is not the backup node, it requests the backup node to replace the master node. This request is made by means of a specific access to a register of the cell DIS of the backup node, the access in this case consisting of a remote reading of the register REF of the backup node. In both cases, the node requesting a ticket need only repeat the ticket request in order to access the new master generator. The request for a ticket is also repeated when the previous request occurred during the replacement period of the master node, in order to access the new master generator. Of course, other possibilities are offered as well.

The result is a multi-node data processing system SYS comprising a ticket distribution mechanism MEC in nodes of the system, a ticket identifying a task or an event in the system, the mechanism comprising, in a master node, a hardware ticket generating means TICK and, in each of the nodes, a means REF for storing the address TICK_ID of the ticket generator and a means (P, CTL) for controlling access to the storage means of the corresponding node and to the ticket generator of the master node.

This definition is based on that of the process and does not include the concept of the ticket distribution cell DIS of the mechanism illustrated. The definition of such a cell can be broadened, however. It has been stated that the storage means can be a memory or a memory location. Likewise, the means for controlling access to the storage means REF and to the ticket generator TICK can be a processor of the node instead of the device CTL. The following definition of the invention includes a processor in the concept of a cell.

A multi-node data processing system SYS according to the invention comprises a ticket distribution mechanism MEC, a ticket identifying a task or an event in the system, the mechanism being distributed in nodes of the system in respective ticket distribution cells DIS comprising, in a master node, a hardware ticket generating means, and in each of the nodes, a means (REF) for storing the address (TICK_ID) of the ticket generator and a means (P, CTL) for controlling access to the storage means of the corresponding node and to the ticket generator of the master node.

According to a variant of the example illustrated, each of the cells of at least two of these nodes includes a hardware ticket generating means TICK, and the mechanism MEC comprises means (CTL, VAL) for validating the ticket generator of the master node.

The access control means can be the same for both accesses or can be different depending on whether the access is to the storage means REF or to the ticket generator. For example, access to the storage means can be controlled by a processor P and access to the ticket generator can be controlled by a different means, such as a microprocessor. According to the advantageous option chosen, the control means is common to both accesses and is not a processor. It is an intermediate means between the processor and the register REF and optionally the register TICK of the node, such as the control device CTL illustrated. It has been seen that the latter reacts to a ticket request by a processor of the node so as to read, in the storage means of this node, the address TICK_ID of the ticket generator, to access this generator in order to obtain the ticket, and to send the ticket to the requesting processor as a response to its request. However, it has been seen that part of these tasks can be entrusted to it. In other words, generally, the control means other than a processor in a node is connected to at least one processor of this node.

According to another advantageous option, the ticket distribution mechanism MEC includes means for writing in the storage means REF and/or in the ticket generator of a cell DIS. The means illustrated are contained in the control device CTL incorporated into the cell. The write operation in the register REF assumes that the address contained in this register can change, particularly in case of a failure of the master node. In this case, the new address TICK_ID of the master ticket register TICK can be written in all of the registers REF of the system. On the other hand, in the system illustrated, the write operation in the ticket generator is executed so as to change the number of the ticket in the fields SESS and COUNT, or to update the session number in the master node and the backup node, or to validate the ticket in the field VAL.

In the system SYS illustrated, each ticket distribution cell DIS of a node is incorporated into an internodal communication module ISL preferably contained in an integrated circuit IC. Thus, the cell has the advantage of using, in the module ISL, the link to the bus SB and an internodal link controller CTR. However, the module ISL may not be directly connected to the system bus SB, but to another bus such as an input-output bus, or a PCI (Peripheral Component Interconnect) bus, for example. On the other hand, the cell could be contained in another integrated circuit, separate from the module ISL and connected to a bus of the node. In this case, it must be connected to a bus of the system, either the system bus SB or another bus, and the exchanges with the processor and the module ISL must transit through this bus. Generally, however, the access path to the storage means of the node and to the ticket generator of the master node may not include a bus. It has also been seen that the functions of the control device CTL can be executed by dedicated logic circuits, or can be programmed into a microprocessor or a microcontroller, for example included in the integrated circuit which incorporates the module ISL, or can even be executed by a processor of the node.

Therefore, a corollary subject of the invention is a data processing node, for example Nx, comprising at least one processor Pxm, a memory Mx, a bus SBx, and a ticket distribution cell DIS for implementing the process or the system defined above.

Another corollary subject of the invention is an integrated circuit IC incorporating a ticket distribution cell DIS for implementing the process or the system which have just been presented.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the appended claims.

We claim:

1. A process for distributing a ticket identifying a task or an event in a multi-node data processing system (SYS) having ticket generating means (TICK) located at a specific address for generating a ticket, comprising determining from among the nodes of the system a master node (Ny) for distributing the ticket, storing the address (TICK_ID) of the ticket generating means in said nodes, requesting a ticket by one of said nodes, reading the address of the ticket generating means by the requesting node and accessing the ticket generator means for distributing the task or event identifying ticket.

2. A process according to claim 1, further comprising identifying each ticket by a first field (SESS) representing a continuous time period of ticket distribution by the ticket generating means in the master node (Ny) and by a second field (COUNT) representing, during this period, the number of accesses to said ticket generating means at the moment of said access corresponding to said ticket request.

3. A process according to claim 2, wherein said ticket generating means is included in at least two nodes of the system, one of which is the master node (Ny), and further comprising validating only the ticket generating means of the master node (VALy=1).

4. A process according to claim 2, wherein said ticket generating means is included in at least two nodes of the system, one of which is a master node (Ny), characterized in that it consists of determining a backup node (Ns) and replacing the master node with said backup node, when said requesting node requesting a ticket cannot access the ticket generating means of the master node.

5. A process according to claim 4, characterized in that it consists of modifying, in all of said nodes, said address (TICK_ID) of the ticket generating means when the master node is replaced by the backup node.

6. A process according to claim 1, wherein said ticket generating means is included in at least two nodes of the system, one of which is the master node (Ny), and further comprising validating only the ticket generating means of the master node (VALy=1).

7. A process according to claim 1, wherein said ticket generating means is included in at least two nodes of the system, one of which is a master node (Ny), characterized in that it consists of determining a backup node (Ns) and replacing the master node with said backup node, when said requesting node requesting a ticket cannot access the ticket generating means of the master node.

8. A process according to claim 7, characterized in that it consists of modifying, in all of said nodes, said address (TICK_ID) of the ticket generating means when the master node is replaced by the backup node.

9. A process according to claim 8, characterized in that when said requesting node requesting a ticket cannot access the ticket generating means of the master node, said requesting node requests the replacement of the master node and effects replacement if the requesting node is the backup node, and re-executes the request for a ticket so as to access a ticket generating means in the backup node.

10. A process according to claim 7, characterized in that when said requesting node requesting a ticket cannot access the ticket generating means of the master node, said requesting node requests the replacement of the master node and effects replacement if the requesting node is the backup node, and re-executes the request for a ticket so as to access a ticket generating means in the backup node.

11. A multi-node data processing system (SYS) wherein a ticket identifies a task or an event in the system comprising a ticket distribution mechanism (MEC), the ticket distribution mechanism being distributed in nodes of the system in respective ticket distribution cells (DIS) comprising, in a master node, a ticket generator (TICK) and in each of said nodes, a reference register (REF) for storing an address (TICK_ID) of the ticket generator (TICK) and a processor control means (P, CTL) for controlling access to the reference register of the corresponding node and to the ticket generator of the master node.

12. A system according to claim 11, characterized in that at least two of said nodes include cells each of which include a second ticket generator, and said ticket distribution mechanism includes control means (CTL, VAL) for validating the ticket generator of the master node.

13. A system according to claim 12, wherein said control means (CTL) is connected to at least one processor (P).

14. A system according to claim 12, characterized in that said processor control means (P,CTL) includes means for writing in the reference register (REF) and/or in the ticket generator (TICK).

15. A system according to claim 11, wherein said control means (CTL) is connected to at least one processor (P).

16. A system according to claim 15, characterized in that said processor control means (P,CTL) includes means for writing in the reference register (REF) and/or in the ticket generator (TICK).

17. A system according to claim 11, characterized in that said processor control means (P,CTL) includes means for writing in the reference register (REF) and/or in the ticket generator (TICK).

18. A system according to claim 11, characterized in that the ticket generator (TICK) includes a counter (COMP) and a register connected to the counter.

19. A system according to claim 11, wherein a ticket distribution cell (DIS) is incorporated into an internodal communication module (ISL) in a node.

20. A multi-node data processing system (SYS) for obtaining a unique number identifier called a ticket identifying a task or an event, comprising a master node (Ny) for distributing the ticket in the system, said master node including a ticket generator (TICKy: VALy, SESSy, COUNTy) having a unique address (TICK_ID), a reference register (REF) in each node for storing the address of the ticket generator, means in each node (Ny) for requesting a ticket and reading the address (TICK_ID) in the reference register in each node to thereby access the ticket generator of the master node (Ny), and a backup node (Ns) adapted to replace the master node (Ny) in case of a failure (TICK-MISS).

21. A data processing node (Nx) comprising at least one processor (Pxm), a memory (Mx) a bus (Sbx), a ticket generating means (TICK) located at a specific address for generating a ticket identifying a task or event, a reference register (REF) for storing an address (TICK_ID) of the ticket generating means (TICK), a processor control means (P, CTL) for controlling access to the reference register of the corresponding node and to the ticket generator (TICK) of the master node, a master node (Ny) for distributing the ticket, said master node (Ny) being operatively interconnected to a ticket distribution cell (DISx) for distributing the ticket in a multi-node data processing system (SYS).

22. An integrated circuit (IC) comprising a ticket distribution circuit (DIS) for distributing a ticket identifying a task or an event in a multi-node data processing system (SYS) including a master node (Ny) for distributing the ticket, an internodal link controller connected to the ticket distribution circuit (DIS), a decoder connected to the internodal link controller and a system bus of the processing system for decoding signals from the system and controller and directing them to an address within the system.

* * * * *